United States Patent [19]

Crawmer et al.

[11] Patent Number: 5,351,395
[45] Date of Patent: Oct. 4, 1994

[54] PROCESS FOR PRODUCING TURBINE BUCKET WITH WATER DROPLET EROSION PROTECTION

[75] Inventors: Gerald R. Crawmer, Clifton Park; Paul F. Murley, Albany; James R. Pedersen, Schenectady, all of N.Y.

[73] Assignee: General Electric Company, Schenectady, N.Y.

[21] Appl. No.: 999,518

[22] Filed: Dec. 30, 1992

[51] Int. Cl.$^5$ .............................. B23P 15/00
[52] U.S. Cl. ................ 29/889.7; 29/889.21; 29/889.1; 416/224
[58] Field of Search ............. 29/889.21, 889.7, 889.1, 29/402.07, 402.08, 402.13; 228/119; 416/224

[56] References Cited

U.S. PATENT DOCUMENTS

| | | | |
|---|---|---|---|
| 2,143,466 | 1/1939 | Allard | 29/889.21 |
| 2,392,281 | 1/1946 | Allen | 29/889.21 |
| 3,215,511 | 11/1965 | Chisholm et al. | 29/889.21 |
| 4,795,313 | 1/1989 | Coulon | |
| 4,808,055 | 2/1989 | Wertz et al. | 29/889.1 |
| 4,832,252 | 5/1989 | Fraser | 228/119 |
| 5,031,313 | 7/1991 | Blair et al. | 29/889.7 |
| 5,033,938 | 7/1991 | Fraser et al. | 29/889.1 |
| 5,062,205 | 11/1991 | Fraser | 29/889.1 |

FOREIGN PATENT DOCUMENTS

| | | |
|---|---|---|
| 0379922 | 8/1990 | European Pat. Off. . |
| 0392656 | 10/1990 | European Pat. Off. . |
| 0249092 | 12/1987 | France . |
| 56-044758 | 4/1981 | Japan . |
| 62-180040 | 8/1987 | Japan . |
| 4116126 | 4/1992 | Japan . |
| 483558 | 2/1970 | Switzerland . |
| 1230536 | 5/1971 | United Kingdom . |
| 1253187 | 11/1971 | United Kingdom . |

OTHER PUBLICATIONS

"Continuously-Coupled 40-Inch Titanium Last-Stage Bucket Development", GE Turbine Reference Library, p. 6.

*Primary Examiner*—Irene Cuda
*Attorney, Agent, or Firm*—Nixon & Vanderhye

[57] ABSTRACT

A process of manufacturing a steam turbine bucket having water droplet erosion resistance including the steps of:

a) forming a bucket (10) of a first steel alloy having a blade portion (12), the blade portion having a leading edge (14) and a trailing edge (16);

b) welding an insert (18) of a second steel alloy to the leading edge (14) of the bucket;

c) heat treating the bucket (10) and insert (18);

d) finish machining the bucket (10) and insert (18); and d) hardening the insert (18) to impart water droplet erosion resistance to the insert.

12 Claims, 1 Drawing Sheet

PROCESS FOR PRODUCING TURBINE BUCKET WITH WATER DROPLET EROSION PROTECTION

TECHNICAL FIELD

This invention relates to manufacturing methods for turbine buckets and, more specifically, to a method for imparting water droplet erosion resistance to a steel turbine bucket during manufacture of the bucket. The invention also relates to a turbine bucket produced by the disclosed process.

BACKGROUND PRIOR ART

It is generally recognized that the performance of a steam turbine is greatly influenced by last stage bucket designs that efficiently utilize the expansion of steam to the exhaust pressure of the site, and that minimize the kinetic energy of the flow leaving the last stage bucket.

The service requirements of turbine buckets, however, can be very complex and demanding. This is particularly true in the case of last stage steam turbine buckets which experience a variety of conditions including corrosive environments due to high moisture and carry over from the boiler. These conditions lead to various types of corrosion of the bucket material. Moreover, turbine buckets also experience high tensile loadings and are subject to cyclic stresses which, when combined with a corrosive environment, can be particularly damaging to the bucket. In addition, since the steam is very wet in the last stage region, water droplet erosion of the bucket material occurs which, in turn, reduces the useable service life of the bucket as well as the efficiency of the turbine as a whole. In advanced cases of erosion, actual failure of the bucket may occur.

It is difficult and, in some cases impossible, to find a bucket material which can meet all of the required critical properties in a particular design application. This is especially true in advanced designs where longer buckets are specified, increasing both the strength requirements and the severity of erosion experienced by the buckets. Moreover, the higher stresses inherent in these designs increases the potential for stress corrosion cracking, and the higher strength required in the bucket material further exacerbates the problem through increased susceptibility to such cracking. The effects of pitting corrosion in initiating corrosion fatigue is also magnified by the higher applied stresses. Thus, alloy selection to satisfy basic bucket requirements may not be compatible with erosion resistance requirements, nor the attachment of erosion resistant shielding material.

Previous approaches to solving this problem depended on specific requirements. In some cases, where demands were not so servere, one material in one condition could satisfy all the requirements. When greater erosion resistance was required, the bucket material has been hardened through local heat treating (flame or induction hardening) at the leading edge to provide additional erosion resistance. Alternatively, an erosion resistant shielding material such as stellite has been attached (by brazing, gas tungsten arc or electron beam welding) at the near finished machined stage in the bucket production. The attachment methods almost invariably lead to some degradation of properties in the weld heat affect zone, however, and defective welds resulted in costly scrapping of finished buckets.

In published European patent application 0 379 922, there is disclosed a method of manufacturing or repairing a turbine blade which includes welding an insert to a leading edge of the blade and then hardening a part of the insert so as to provide a leading outer edge part of the blade with a hardened surface. The disclosure is careful to point out that the hardening does not fully extend as far as the junction between the insert and the blade so that there exists adjacent the boundary with the remainder of the blade a portion of the insert of substantially unhardened material.

SUMMARY OF THE INVENTION

The object of this invention is to provide a bi-metallic structure which will satisfy all requirements in highly stressed last stage buckets for steam turbines. The process sequence embodied in the invention allows the attachment of an erosion resistant insert material while both the bucket and insert material are in a near optimum weldability condition. Further, welding is done at a point in the production process which allows ready reworking of defects, and thus minimizes scrap resulting from such defects. The bi-metallic assembly may be heat treated after welding to optimize bucket properties without great concern for distortion accompanying heat treatment, since the bucket is not in the finished or near finished machined condition. The insert material may be hardened after machining by flame or other method to provide required erosion resistance, and then stress relieved.

More specifically, the process in accordance with this invention includes producing a bucket forging of a stainless steel alloy with good corrosion resistance and the ability to withstand strength-increasing heat treatment, and then solution annealing the bucket to exhibit good weldability. A second steel alloy insert material with adequate water drop erosion resistance (and which is in a tempered condition also amenable to welding), is welded into the leading edge of the bucket. The bucket then may be heat treated (by aging for example) before, during or after machining to achieve desired properties in the bucket/insert assembly, i.e., to achieve properties which are desired for successful performance under operating conditions. After final machining, the insert can be hardened by, for example, flame hardening, to provide the required erosion resistance. The hardening operation is carried out in such a way as to extend fully through the insert material and into the bucket material, as described in greater detail further herein. A final stress relief operation may then be carried out on the otherwise completed bucket.

The invention also relates to a turbine bucket assembly manufactured in accordance with the above described process.

In its broader aspects, therefore, the invention provides a process of manufacturing a turbine bucket comprising a mounting portion and a blade portion having a leading edge and a trailing edge, the process including at least the steps of forming, finish machining and heat treating, the improvement comprising the steps of:
 a) attaching a metal alloy insert to the leading edge of the bucket;
 b) machining the insert and bucket; and
 c) hardening the insert after finish machining, to thereby impart erosion protection to the bucket.

In another aspect, the invention provides a process of manufacturing a steam turbine bucket having water droplet erosion resistance comprising the steps of:

a) forming a bucket of a first steel alloy having a mounting portion and a blade portion, the blade portion having a leading edge and a trailing edge;
b) welding an insert of a second steel alloy to the leading edge of the bucket;
c) aging the bucket and insert;
d) finish machining the bucket; and
e) hardening the insert to impart water droplet erosion resistance to the insert, wherein hardening is carried out through substantially the entire thickness of the insert.

In another broad aspect, the invention provides a bi-metallic turbine bucket produced in accordance with the disclosed process.

The above described invention thus provides a bi-metallic bucket structure which satisfies all of the requirements for buckets in highly stressed last stage buckets for steam turbines.

Additional objects and advantages of the invention will become apparent from the detailed description which follows.

BEST MODE FOR CARRYING OUT THE INVENTION

Figure 1:
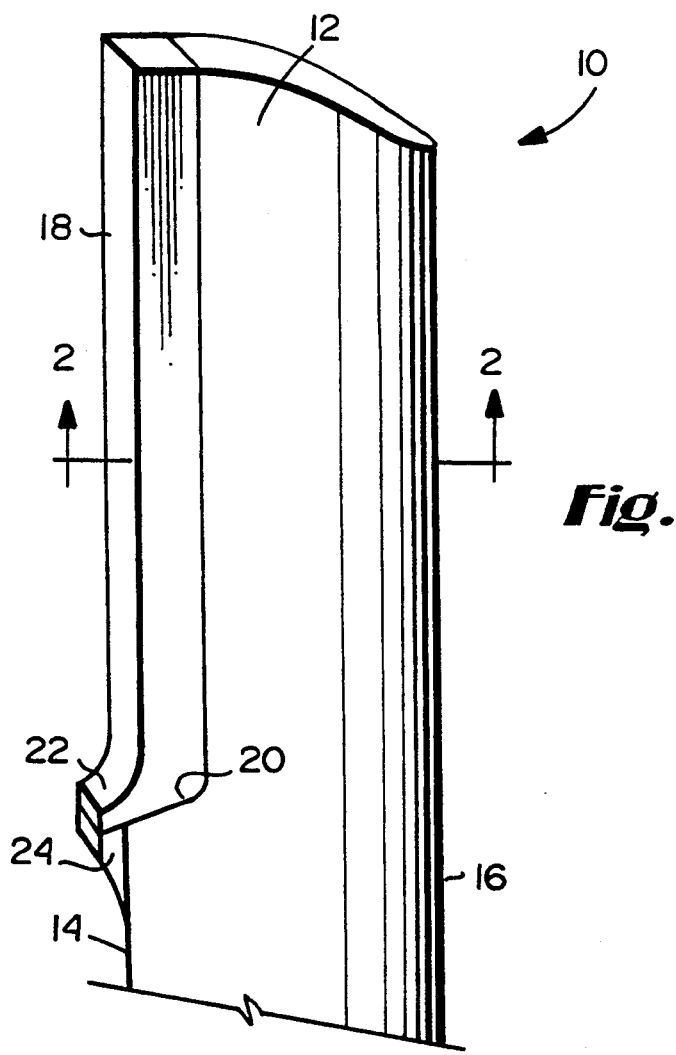
FIG. 1 is a partial perspective of a turbine bucket with an insert welded along the leading edge, prior to finish machining.

With reference to the drawings, a last stage turbine bucket 10 is partially illustrated which includes a blade portion 12, and a root or mounting portion (not shown). The blade 12 includes a leading edge 14 and a trailing edge 16.

In accordance with this invention, an insert bar 18 is attached to a weld prep or cut-out area 20 of the leading edge 16. The means of attachment may be any compatible joining process such as fusion welding, solid state diffusion, brazing, etc. It is significant to this invention that the joining of the insert bar 18 to the leading edge 16 be carried out when both are in a near optimum weldability condition (as determined by the material composition of the bucket 10 and insert 18).

Figure 2:
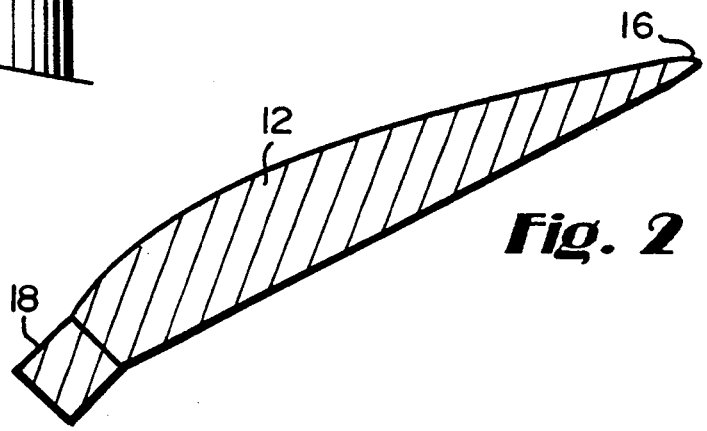
FIG. 2 is a cross section taken along the line 2—2 of FIG. 1.
Figure 3:
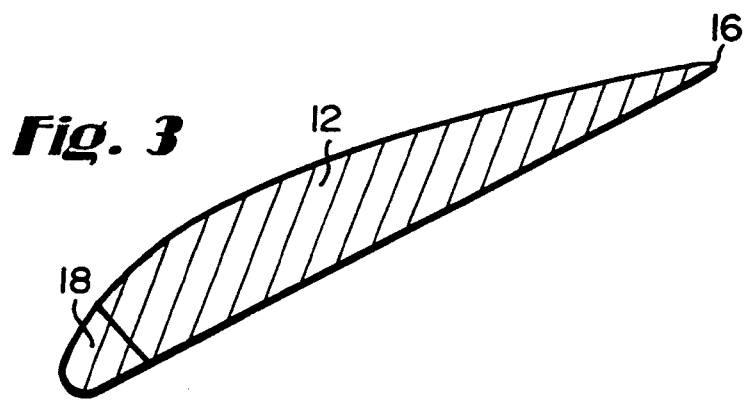
FIG. 3 is a cross section of the turbine bucket after final machining.

The insert bar 18 may contain excess material at radially inner and outer ends (one such "run-out 22 shown at the radially inner end of the bar 18), with weld material 24 shown at the interface with the bucket. The excess material is later removed in the machining process. In FIGS. 1 and 2, the insert bar 18 is shown in its initial elongated, squared-off, stock cross-sectional shape, prior to machining. The initial shape of the insert bar is such that it can be easily non-destructively tested after welding. After the testing, the insert is machined to its final shape and hardened. FIG. 3 illustrates the finished insert shape, after machining. The specifics of the process are explained in greater detail with reference to the following Example.

EXAMPLE

A turbine bucket 10 is formed from a base material comprising, for example, GTD-450, a transformable, age hardenable stainless steel alloy which has good corrosion resistance and which is capable of being heat treated to high levels of strength. The bucket is produced by a conventional lost wax investment casting technique. The cast bucket 10 is preferably solution annealed (in a conventional manner, as determined by the alloy composition) to a condition which is favorable to the weldability of the alloy. Because the GTD-450 alloy has inadequate water droplet erosion resistance, however, even at high levels of strength or in the flame hardened condition, a second stainless steel alloy, such as a modified 403 type stainless steel (403+Cb) is selected as the insert bar 18 material. The 403+Cb alloy has inadequate corrosion resistance as a bucket material at high strength levels, but satisfactory erosion resistance when flame hardened. The 403+Cb stainless alloy is also tempered to a condition amenable to welding, i.e., tempered to a desired hardness value which is less than the hardness of the bucket material (in the solution annealed condition). In accordance with the invention, a weld prep area 20 is machined into the bucket leading edge and the insert bar 18 is welded into place as shown in FIG. 3.

Before machining, the bucket and insert may be heat treated (by aging, for example) to optimize the desired properties of the bucket. It will be appreciated, however, that the heat treatment may continue during and/or after machining. When heat treatment occurs prior to machining, there need not be any great concern for distortion to the bucket and/or insert since any such distortion can be removed in the finish machining operation.

After final machining step, the 403+Cb insert material may be hardened, by flame hardening for example, to provide the required erosion resistance. Flame hardening is carried out until the desired hardness of the insert 18 is achieved. In accordance with this invention, hardening is carried through the insert, i.e., the hardness of the entire insert is increased. Because the bucket is a martensitic steel, however, its hardness in an area adjacent the insert is somewhat reduced, creating a relatively softer buffer between the hard insert material and the remaining harder part of the bucket. This slight reduction in hardness in the base or bucket material is of no particular concern since the base or bucket material was initially harder than the insert material.

The final step in the process is a conventional stress relief operation, intended to remove stresses incurred during machining, but carried out so as to have little or no effect on the hardness of the bucket/insert assembly.

While the above process has been developed for long buckets, e.g., 40" steel last stage steam turbine buckets, the process may be applied to other bucket designs as well. In addition, the process may be applied to other material compositions for the bucket and the insert bar, with the process parameters altered accordingly.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A process of manufacturing a turbine bucket including a mounting portion and a blade portion having a leading edge and a trailing edge, the process including the steps of:
   a) forming the bucket:

b) solution annealing the bucket to a condition amenable to welding:

c) tempering a metal alloy insert to a hardness less than the bucket in the solution annealed condition:

d) welding the insert to the leading edge of the bucket:

e) machining the insert and bucket; and f) hardening the insert after maching, to thereby impart erosion to the bucket.

2. The process of claim 1 wherein step a) is carried out by machining a weld prep into the leading edge and then welding the insert to the weld prep.

3. The process of claim 1 wherein the bucket is heat treated before machining.

4. The process of claim 1 wherein the bucket is heat treated during machining.

5. The process of claim 1 wherein the bucket is heat treated after machining.

6. The process of claim 1 wherein step c) is carried out by flame hardening the insert.

7. The process of claim 1 wherein the bucket and the insert are comprised of different stainless steel alloys.

8. The process of claim 7 wherein the bucket is comprised of a GTD-450 stainless steel alloy.

9. The process of claim 8 wherein the insert is comprised of a 403+Cb stainless steel alloy, and wherein as a result of step b), the hardness of the insert is increased and the hardness of an adjacent area of the bucket is decreased.

10. The process of claim 7 wherein the insert is comprised of a 403+Cb stainless steel alloy.

11. A process of manufacturing a steam turbine bucket having water droplet erosion resistance comprising the step of:

a) forming a bucket of a GTD-450 stainless steel alloy having a mounting portion and a blade portion, the blade portion having a leading edge and a trailing edge;

b) solution annealing the bucket to a condition amenable to welding;

c) tempering a metal alloy insert to a hardness less than the bucket in the solution annealed condition;

d) welding an insert of a 403+Cb stainless steel alloy to the leading edge of the bucket;

e) aging the bucket and insert;

f) machining the bucket and insert; and g) hardening the insert to impart water droplet erosion resistance to the insert, wherein hardening is carried out through substantially the entire thickness of the insert.

12. The process of claim 11 wherein step d) is carried out by flame hardening the insert.

* * * * *